United States Patent [19]
Sauer et al.

[11] Patent Number: 5,816,673
[45] Date of Patent: Oct. 6, 1998

[54] COMPUTER CHASSIS ASSEMBLY

[76] Inventors: James P. Sauer, 6730 Seinfeld Ct., Houston, Tex. 77069; George J. Scholhamer, 43 Village Knoll Pl., The Woodlands, Tex. 77381; William C. Galloway, 14902 Mesita Dr., Houston, Tex. 77083

[21] Appl. No.: 730,470

[22] Filed: Oct. 11, 1996

[51] Int. Cl.$^6$ .............................. A47B 81/00; H05K 7/10
[52] U.S. Cl. ................................ 312/223.2; 312/223.1; 361/725; 361/683
[58] Field of Search ........................... 312/223.22, 223.1, 312/263, 265.5; 361/683, 685, 725, 726, 727, 802

[56] References Cited

U.S. PATENT DOCUMENTS

| | | | |
|---|---|---|---|
| 4,725,244 | 2/1988 | Chewning et al. | 361/683 X |
| 4,967,311 | 10/1990 | Ferchau et al. | 361/727 X |
| 5,031,075 | 7/1991 | Casanova et al. | 361/683 X |
| 5,032,951 | 7/1991 | Schropp et al. | 361/726 |
| 5,051,868 | 9/1991 | Leverault et al. | |
| 5,136,468 | 8/1992 | Wong et al. | |
| 5,175,669 | 12/1992 | Navia et al. | 361/683 |
| 5,218,760 | 6/1993 | Colton et al. | 361/683 X |
| 5,224,020 | 6/1993 | Golledge et al. | |
| 5,224,024 | 6/1993 | Tu et al. | |
| 5,277,615 | 1/1994 | Hastings et al. | |
| 5,305,183 | 4/1994 | Teynor | 361/683 X |
| 5,309,323 | 5/1994 | Gray et al. | 361/726 |
| 5,338,214 | 8/1994 | Steffes et al. | 361/683 X |
| 5,340,340 | 8/1994 | Hastings et al. | |
| 5,477,415 | 12/1995 | Mitcham et al. | |
| 5,490,723 | 2/1996 | Driscoll et al. | 312/223.1 X |
| 5,495,389 | 2/1996 | Dewitt et al. | 361/683 |

FOREIGN PATENT DOCUMENTS

| 333618 | 9/1989 | European Pat. Off. | 361/683 |
|---|---|---|---|

*Primary Examiner*—Peter M. Cuomo
*Assistant Examiner*—Hanh V. Tran
*Attorney, Agent, or Firm*—Jenkens & Gilchrist

[57] ABSTRACT

A modular computer chassis constructed with a center pluggable interface adapted for the modular mounting of components on opposite sides thereof. The chassis includes frontal and rear regions which are open and adapted for receipt of modular computer components therein for direct coupling to the center pluggable interface. An isolation frame is also provided within the chassis for physically and electrically isolating select components therein one from the other. A slidable mounting array is also provided for facilitating flexibility in the mounting of half height and one-third height disk drives adjacent to the center pluggable interface for flexibility in the design and utilization of the chassis of the present invention.

15 Claims, 6 Drawing Sheets

COMPUTER CHASSIS ASSEMBLY

BACKGROUND OF THE INVENTION

1. Technical Field of the Invention

The present invention relates to a computer chassis and, more particularly, but not by way of limitation, to a computer chassis constructed with a center pluggable interface adapted for the modular mounting of components on opposite sides thereof for effective ease, safety and reliability in their installation and removal.

2. Description of Related Art

Major computer design advances have occurred with the advent of printed circuit boards, integrated circuits and modular component assemblies. Originally, printed circuit boards were formed of lightweight material such as G-10 and FR-4 and housed a wide variety of resisters and transistors and other circuit elements. These circuit elements were connected to the printed circuit board which was interconnected with other printed circuit boards and component assemblies through wiring harnesses. Fortunately, the wiring harnesses and hard wire connections were subsequently replaced by technologically advanced plug-in connectors used for integrally coupling the printed circuit boards and individual components to each other and to other circuitry in the computer.

In the design of computer equipment, the use of connectors, modular components, and specialized hardware has permitted key components such as power supplies and printed circuit board peripherals to be efficiently added and removed at will. The ease in the addition and deletion of computer components and printed circuit boards has facilitated repair, upgrade, and/or changes in computer functionality. Recent innovations have addressed the desirability of inserting and removing modular components and printed circuit boards from electrical equipment, such as computer hardware, when the computer is electrically connected and operational, i.e. "hot." In these cases, it is now possible to remove and insert a computer component into and out of a computer while allowing adjacent computer components to remain "hot." For example, U.S. Pat. Nos. 5,340,340 and 5,277,615 (both assigned to the assignee of the present invention) disclose apparatus for removably supporting a plurality of hot plug-connected hard disk drives.

Removable computer components today include disk drives, cooling fans, display units, and power supplies. As referenced above, the removability of computer components allows for better overall serviceability of the computer system which is a distinct advantage. A defective power supply or disk drive in the main or central computer of a network system generally requires prompt replacement in order to limit downtime. It is for this reason that modular components and connectors are popular in many computer designs. The aspect of component replacement does, however, create new design issues with regard to ease, safety and reliability.

Past approaches to computer construction and component replacement has varied over the years. Originally, ease in removing chassis panel sections of an unplugged computer to expose select components thereof achieved commercial acceptance. Demands for improved serviceability and less down time required yet further innovations. Computer constructions were thus provided to permit opening of chassis sections to afford access to substantially all of the functional components thereof without disconnection of any of the interconnects within the computer. One such design is seen in U.S. Pat. No. 5,051,868 which issued on Sep. 24, 1991. The assembly taught therein permits access to the computer components for maintenance and repair while the computer is fully functional. The top and bottom of the chassis are split and unfold to provide such access. Likewise, U.S. Pat. No. 5,136,468 which issued on Aug. 4, 1992 teaches a modular computer chassis having a main chassis and a sub chassis attachable thereto. The computer components most frequently requiring service may be secured with the sub chassis for ease in removal. The chassis cover is then removed to access the sub chassis. The removing of chassis covers and exposing of substantially all of the functional components of the computer do, however, have reliability and safety considerations.

When electronic equipment as sophisticated as today's computers is exposed to maintenance and repair with power supplied thereto, care must be taken to avoid electrical shocks. There are two basic reasons. First, the safety of the service technician depends upon isolating hot regions which may create shock hazards and personal injury. Secondly, electrical shocks can damage other computer components and cause prolonged down-time and/or data loss. For these reasons, improved chassis designs are needed to facilitate ease, safety and reliability in the installation and removal of components from powered computer.

The present invention provides such an advance over the prior art by providing a computer chassis and associated specialized hardware specifically adapted for the modular mounting of components on opposite sides of a center pluggable interface. Isolation frames and modular mounting slides are provided with plug-in connectors facilitating ease, safety and reliability in the installation, removal and trouble shooting of computer components during the operation of the computer system.

SUMMARY OF THE INVENTION

The present invention relates to a modular computer chassis incorporating a center pluggable interface which may be accessed on opposite sides thereof, and modular connection therewith. More particularly, one aspect of the present invention includes a modular computer chassis comprising a housing having frontal and rear regions which are open therein and adapted for receipt of modular computer components. A center pluggable interface is provided and secured intermediate of the frontal and rear regions, which interface is secured within the housing and adapted for receipt of modules there against. Means are provided for securing the modules within the housing adjacent the interface, and the interface is constructed with multiple printed circuit boards each having connectors thereon adapted for mating with connectors extending from the computer components.

In another aspect, the above described invention includes a plurality of mounting slides secured adjacent to the frontal region of the chassis and directed toward the interface for receiving a variety of computer disk drives therein. The mounting slides are arranged in an array which is complemental to an array of disk drive connectors mounted upon a printed circuit board of the center pluggable interface to facilitate receiving varying numbers of disk drives and the mounting of the disk drives with the center pluggable interface in various combinations. In this manner, disk drives with various heights such as half height and one-third height drives may be utilized within a single computer chassis in accordance with the principles of the present invention.

In a further aspect, the above described invention includes at least one isolation frame secured within the housing adjacent the center pluggable interface for facilitating electrical isolation and separation between adjacent power supplies and other computer components which may be removed therefrom. The isolation frame effectively limits access to various sections of the computer which may be hazardous in the event of repair and/or maintenance.

BRIEF DESCRIPTION OF THE DRAWINGS

A more complete understanding of the apparatus of the present invention may be had by reference to the following detailed description when taken in conjunction with the accompanying drawings wherein.

DETAILED DESCRIPTION

Figure 1:
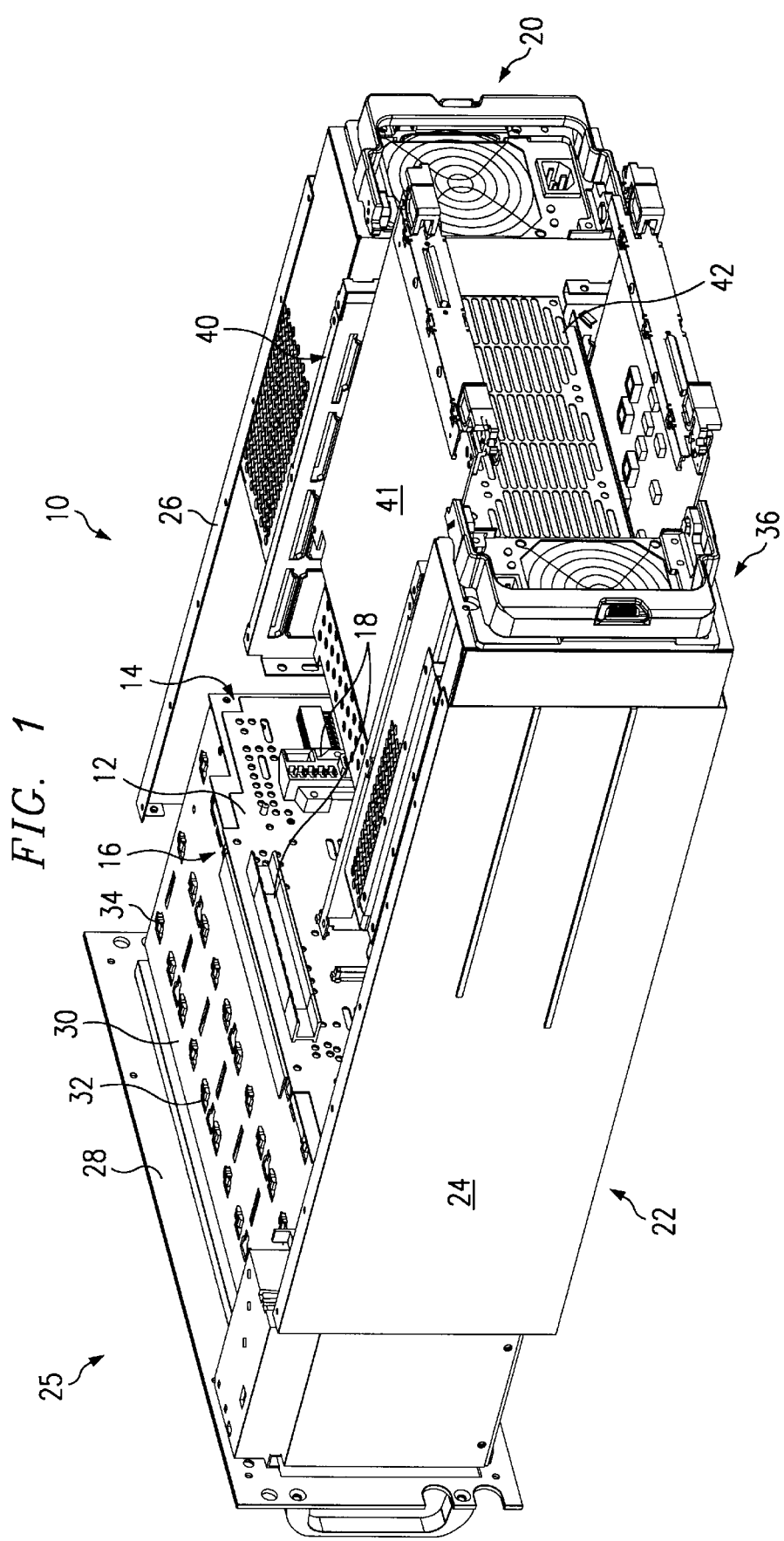
FIG. 1 is a partially exploded, perspective view of a computer chassis constructed in accordance with the principles of the present invention and having portions thereof reserved for illustrating the assembly thereof.

Referring now to the drawings wherein like or similar elements are designated with identical reference numerals throughout the several views, and wherein the various elements depicted are not necessarily drawn to scale, and in particular, to FIG. 1, there is shown an exploded perspective view of one embodiment of a computer chassis assembly 10 constructed in accordance with the principles of the present invention. The computer chassis assembly 10 is constructed with a center pluggable interface 12 which may be accessed on opposite sides 14 and 16 thereof. The center pluggable interface 12 is furthermore constructed with modular connectors 18 thereon adapted for mating with modular components 20 on opposite sides of the center pluggable interface 12. Chassis 10 further comprises a housing 22 including side walls 24 and 26 a fromt portion 25 including a, front panel 28 and top and bottom plates which have been removed for clarity in this particular view. The center pluggable interface 12 is secured intermediate of the frontal panel 28 and rear portion 36 of the chassis 10 whereby the modular components 20 may be assembled thereagainst. Means are provided for securing the modules within the housing 22 adjacent to center pluggable interface 12 as will be described in more detail below.

Referring still to FIG. 1, the components 20 of the chassis 10 are particularly adapted for maximum efficiency in mounting in accordance with the principles of the present invention. For example, the frontal panel 28 includes a chassis subassembly 30 adapted for mounting a plurality of disk drives, as discussed below, in the most reliable and yet flexible configuration. Subassembly 30 is thus shown with the plurality of apertures 32 formed therein in which mounting ears 34 of individual disk drives may be mounted in accordance with the principles of the present invention. The mounting of the disk drives and the flexibility afforded with the present invention will be discussed in more detail below.

Likewise, the utilization of an isolation frame 40 adjacent to center pluggable interface 12 for facilitating electrical isolation and separation between power supplies and other computer components is also provided. Isolation frame 40 is, for example, mounted in the rear portion 36 of housing 22 adapted for receipt of a cooling fan 42, power supplies 62 and 66, and controller cards 67 and 68 therein. These components will also be discussed in more detail below.

In this embodiment isolation frame 40 is configured to receive redundant or backup components. For example frame 40 is configured to receive power supplies 62 and 66 such that if during operation one power supply becomes inoperable, the other power supply takes over until the proper maintenance can be performed on the inoperable power supply. Good results have been achieved by using hot pluggable components in this fashion. This means that a component can be removed and inserted into the chassis without powering down the system. The isolation frame 40 permits the removal and insertion of these components without having to power down the system. Isolation frame 40 isolates each of the areas or slots where the components are connected. This prevents electrical damage to the other components as well as injury to the operator or maintenance person.

Figure 2:
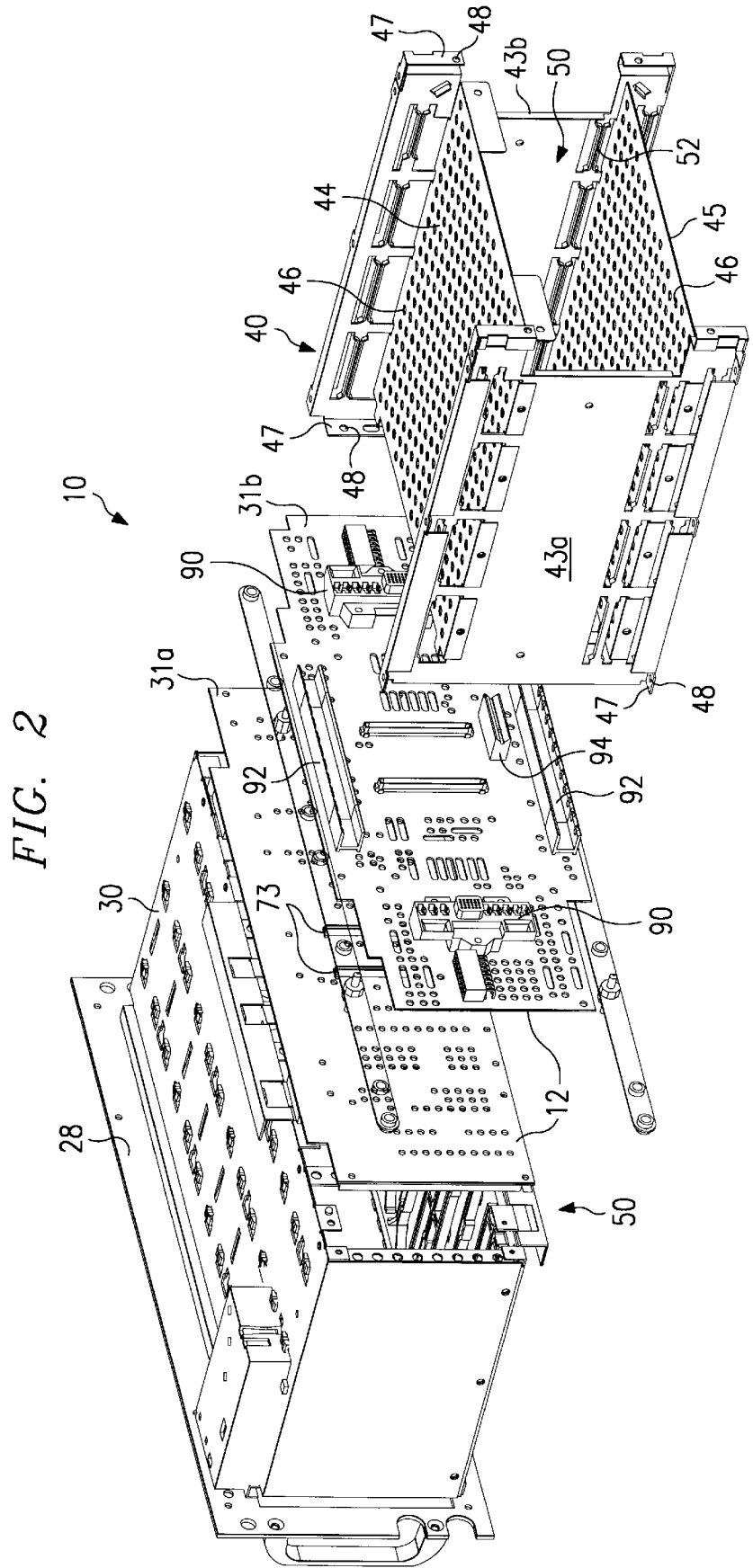
FIG. 2 is a further exploded, perspective view of the computer chassis of FIG. 1 with additional portions removed for illustrating certain aspects of the present invention.

Referring now to FIG. 2, there is shown an exploded view of the chassis 10 of FIG. 1 with the side panels 24 of the housing 22 removed, and with various other components of the chassis 10 removed for purposes of illustration. As presented in FIG. 2, the frontal panel 28 is still connected to the subassembly chassis 30 forward of center pluggable interface 12. In this particular view, front section 31a of center pluggable 12 which has been separated from rear section 31b has also been removed from subassembly chassis 30 to illustrate the presence of guide channels 17 mounting slides 50. The mounting slides 50 are specifically adapted for receipt of and securement for individual disk drives inserted therein. As discussed below, a variety of disk drive mounting configurations are feasible in accordance with the principles of the present invention as facilitated by the current modular designs. Consistent therewith, the front panel 31a of center pluggable interface 12 is constructed for a mating engagement with rear panel 31b of center pluggable interface 12 in the necessary configuration to facilitate said variety of disk drive assemblies mounted therein. The actual interconnection therebetween is not shown as it comprises conventional design aspects with regard to those skilled in the art.

Referring still to FIG. 2, the isolation frame 40 is shown in more detail with top isolation frame panel 41 (shown in FIG. 1) removed to expose a generally orthogonal array of walls or plates secured one to the other for isolating computer components therein and outwardly thereof. Side plates 43a and 43b are thus presented outwardly of orthogonal intermediate plates 44 and 45. Plates 44 and 45 are each perforated with apertures 46 for ventilation purposes.

A plurality of flanges 47 having apertures 48 are also formed at various sides and corners thereof to facilitate the securing of computer components within housing 22 as well as to facilitate the permanent mounting of the side walls of the housing 22 as is conventional for the mounting permanent panel and section members in the computer design.

Unlike conventional assemblies, however, the present assembly affords electrical isolation between the modular elements inserted therein, for example, the cavity 51 formed intermediately of the side walls 43a and 43b and oppositely dispose intermediate walls 44 and 45 is adapted for receiving cooling fan 42 and isolation of other components mounted there around. In that regard, slide members 52 are formed out of side walls 43a and 43b for engagement of and slidable securement for the cooling fan 42. Once installed, the cooling fan 42 is adapted for direct mounting against the center pluggable interface 12 and electrical interconnection therewith for cooling of the components within chassis 10.

Other modular component assemblies and mounting boards may likewise be assembled outwardly of the isolation frame 40 as shown in FIG. 1. When such components are removed, however, access to the center pluggable interface 12 or around the cooling fan 42 may be rendered considerably safer in view of the fact that cooling fan 42 is physically isolated from the region of same components Controller cards 67 and 68 and power supplies 62 and 66 are similarly associated with isolation frame 40.

Figure 3:
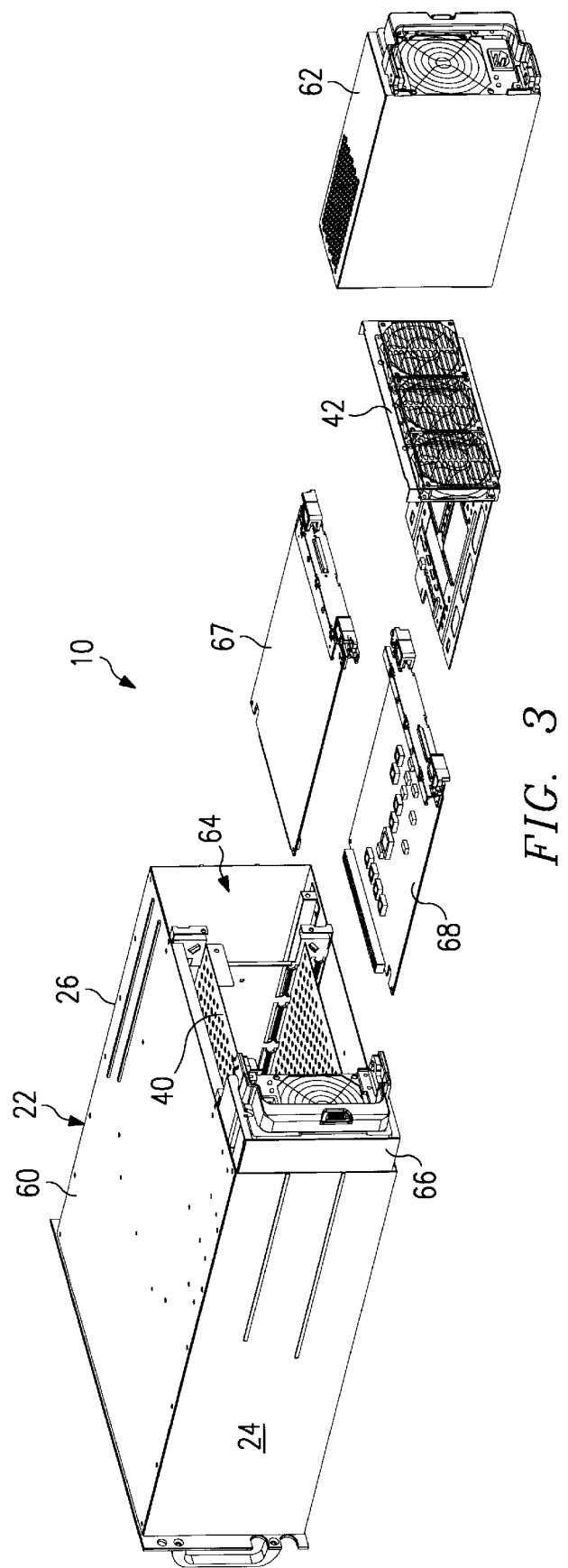
FIG. 3 is another view of the computer chassis of FIG. 1 with select elements thereof exploded outwardly therefrom for illustrating the assembly thereof in conjunction with the illustration of FIG. 2.

Referring now to FIG. 3, there is shown an exploded perspective view of the chassis 10 in a reduced size configuration for illustrating another aspect of the present invention. The housing 22 of the chassis 10 is shown with upper plate 60 mounted thereon atop side panels 24 and 26. In this particular view, the isolation frame 40 may be seen installed within the housing 22 with various components removed for illustrating the assembly thereof. Power supply 62 is thus shown to be removed from the housing 22 illustrating its placement in side region 64 of housing 22 a second power supply 66. Controller cards 67 and 68 are likewise illustrated removed from the housing 22 and their location in regions above and below the isolation frame 40 are more specifically illustrated. Cooling fan 42 is also illustrated in its position outwardly of the isolation frame 40.

Figure 4:
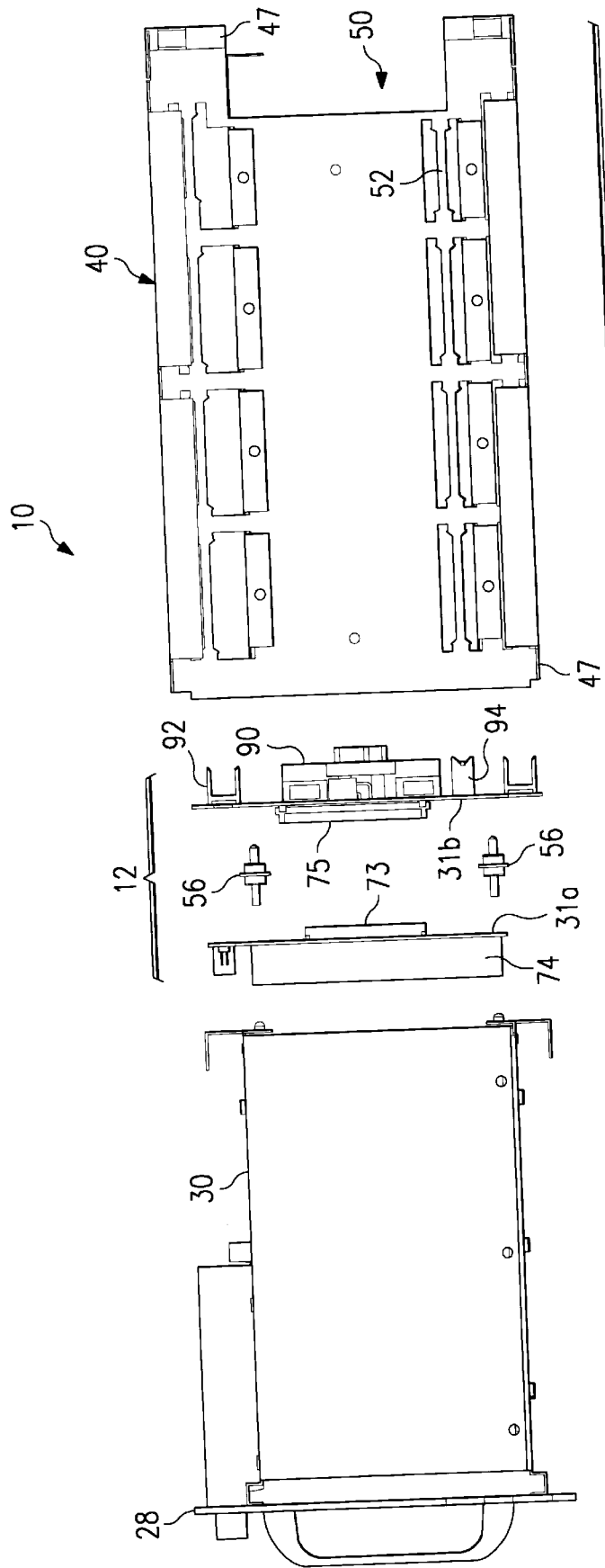
FIG. 4 is a further exploded, side view of the computer chassis of FIG. 1 with additional portions removed for illustrating certain aspects of the present invention.

Referring now to FIG. 4, there is illustrated an exploded side view of computer chassis 10. As depicted center pluggable interface 12 is positioned for assembly between the subassembly 30 and the isolation frame 40. In particular center pluggable interface 12 includes a printed circuit board front section 31a and a printed circuit board rear section 31b. Front section 31a of center pluggable interface 12 includes an array of connectors 74 mounted on one side for connection to computer peripherals such as disk drives, and further includes an array of connectors 73 mounted on a side of front section 31a opposite of connectors 74.

Similarly, rear section 31b of center pluggable interface 12 includes an array of connectors 75 mounted thereon and oriented for connection to connectors 73. As depicted in FIG. 2, connectors 75 are mounted to and extend through rear section 31b. Rear section 31b further includes connectors 90 for connection to power supplies 62 and 66, connectors 92 for connection to controller boards 67 and 68, and connector 94 for connection to cooling fan unit 42.

Center pluggable interface 12 also includes two dowel or alignment pins 56 which ensure the alignment of pluggable interface 12 and isolation frame 40. This, in effect, ensures the alignment of modules that are to be plugged into isolation frame 40 and the connectors present on pluggable interface 12.

Center pluggable interface 12 is a center pluggable interface that permits the center interface of computer components inserted into the rear portion of chassis 10 with computer components inserted into the front portion of chassis 10. For example, computer peripherals such as disk drives are inserted into subassembly 30 and are coupled to center pluggable interface 12 with connectors 74. Similarly cooling fan 42 is inserted into isolation frame 40 and is coupled to center pluggable interface with connector 94. Controller cards 67 and 68 are also inserted into isolation frame 40 and are coupled to center pluggable interface 12 with connectors 92. Likewise, power supplies 62 and 66 are each inserted into isolation frame 40 and are coupled to center pluggable interface 12 with connectors 90.

Center pluggable interface 12 has many advantages over existing technologies, such as facilitating hot pluggable components with surface mount connectors, and reducing the amount of wiring needed to couple the disk drives to the controllers and power supplies. This decreases the cost and assembly time of the system and well as increase the overall reliability of the system.

Figure 5A:
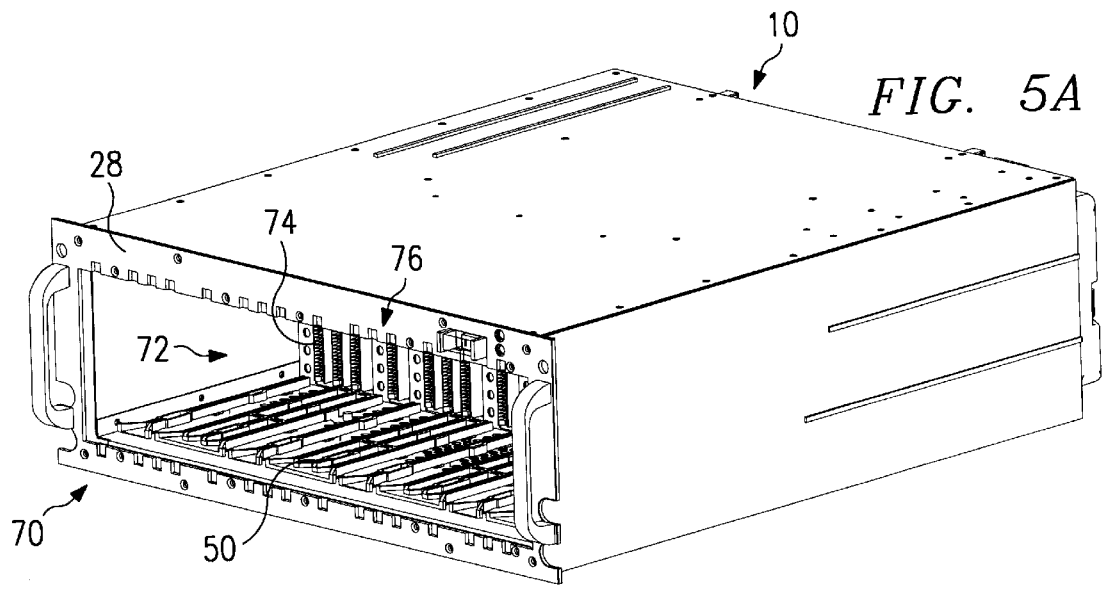
FIGS. 5a, 5b and 5c are perspective views of the computer chassis of FIG. 1 taken from the frontal region thereof and illustrating a variety of disk drive mounting configurations therein.
Figure 5B:
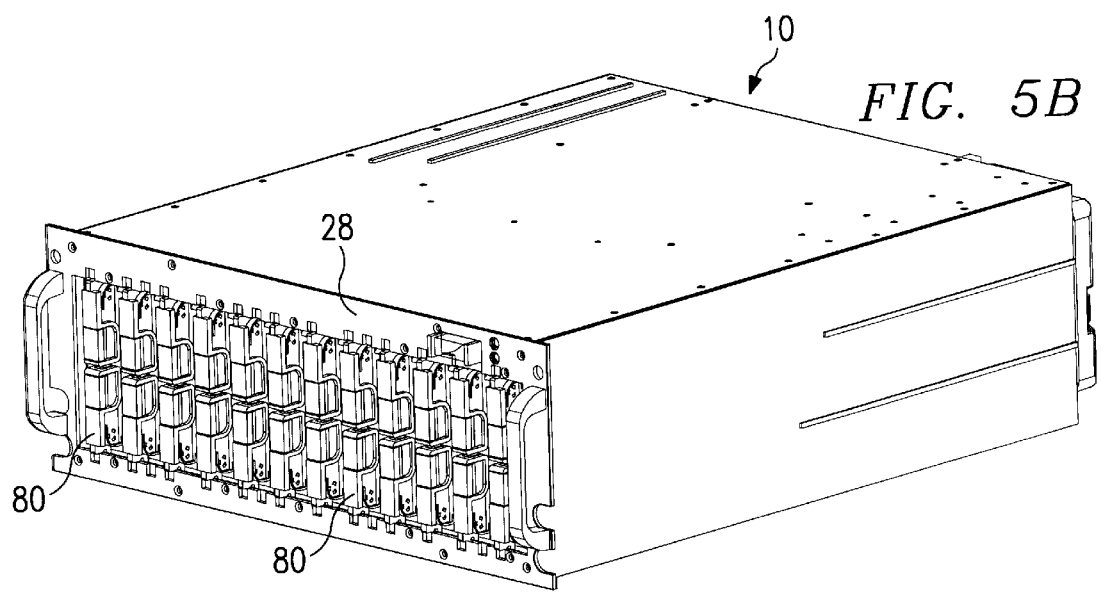
Figure 5C:
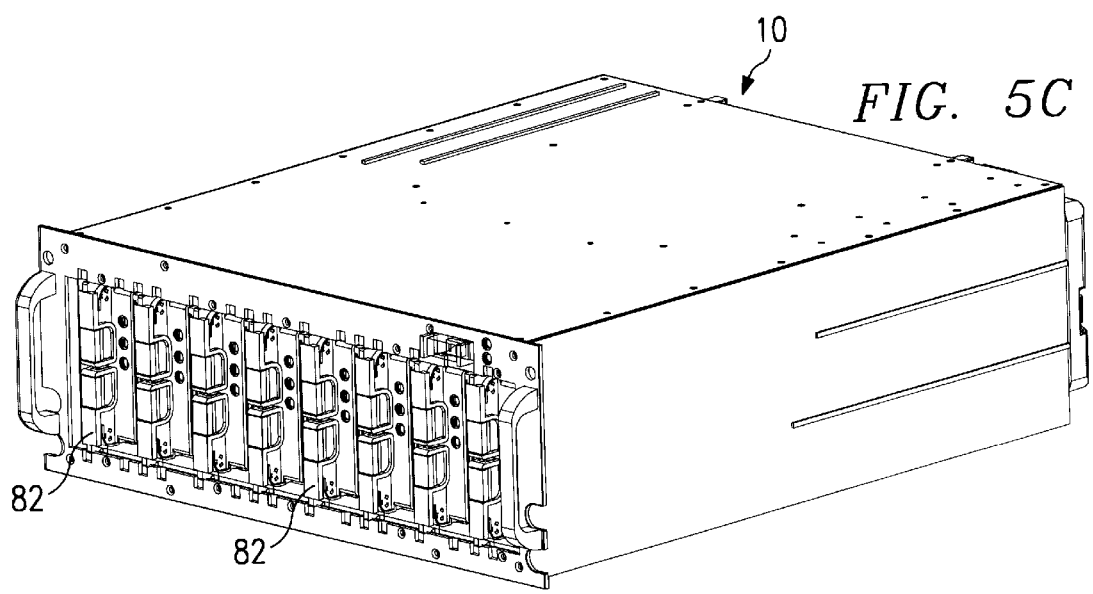
Figure 6A:
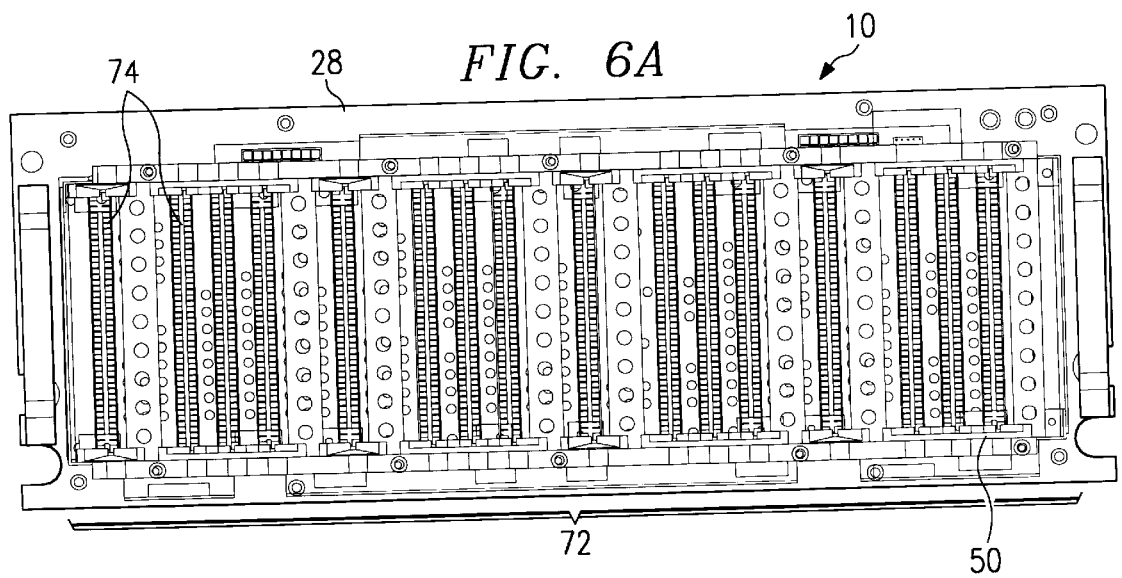
FIGS. 6a, 6b and 6c are frontal views of the computer of he computer chassis of FIG. 1 as similarly shown in FIGS. 5a, 5b and 5c respectively.

Referring now to FIGS. 5a–5c and 6a–6c there are shown views of the chassis 10 of FIG. 1 illustrating the placement of various computer disk drive assemblies therein. FIGS. 5a and 6a show that the front panel 28 is constructed with a frontal opening 70 into which the disk drives are mounted. The mounting slides 50 are mounted in an array 72 which complements connectors 74 mounted in an array 76. The arrays 72 and 76 between the mounting slides and the connectors are adapted for facilitating receipt of mounting and of actual contact for a variety of disk drives therein in a manner facilitating maximum flexibility of the modular chassis in the present invention.

Figure 6B:
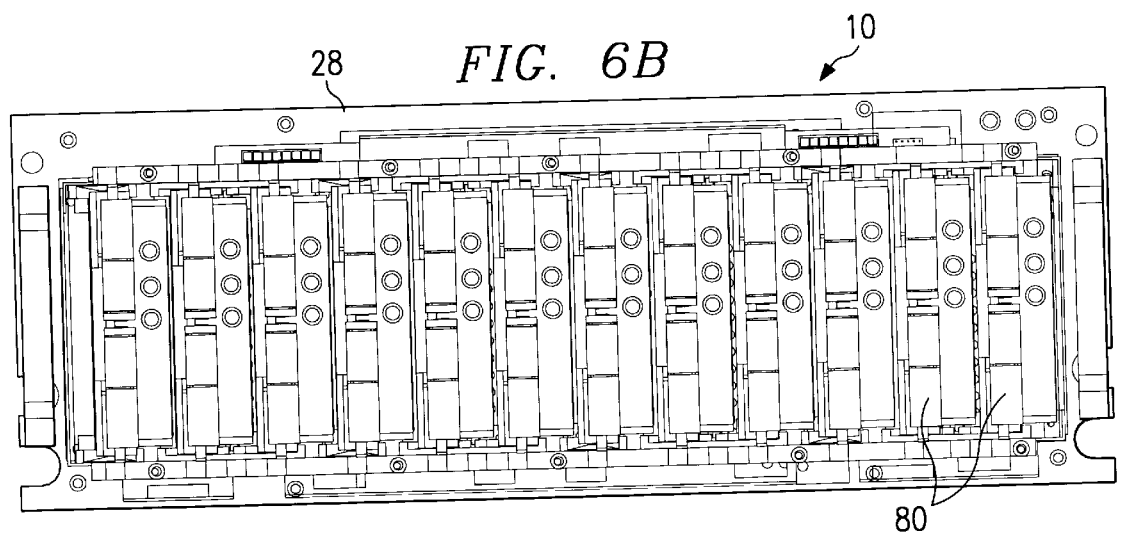

Referring now to FIGS. 5b and 6b, twelve separate one-third height disk drives 80 are assembled within the mounting region 70 of front panel 28 in computer chassis 10. The twelve disk drives are mounted within the mounting slides 50 coupled to the electrical connectors 74. Electrical connectors 74 are disposed on front panel 31a of center pluggable interface 12 and interface with I/O cards 67 and 68 through rear panel 31b of center pluggable interface 12. This configuration affords the user a functional disk drive array with an array of one-third height drives mounted therein.

Figure 6C:
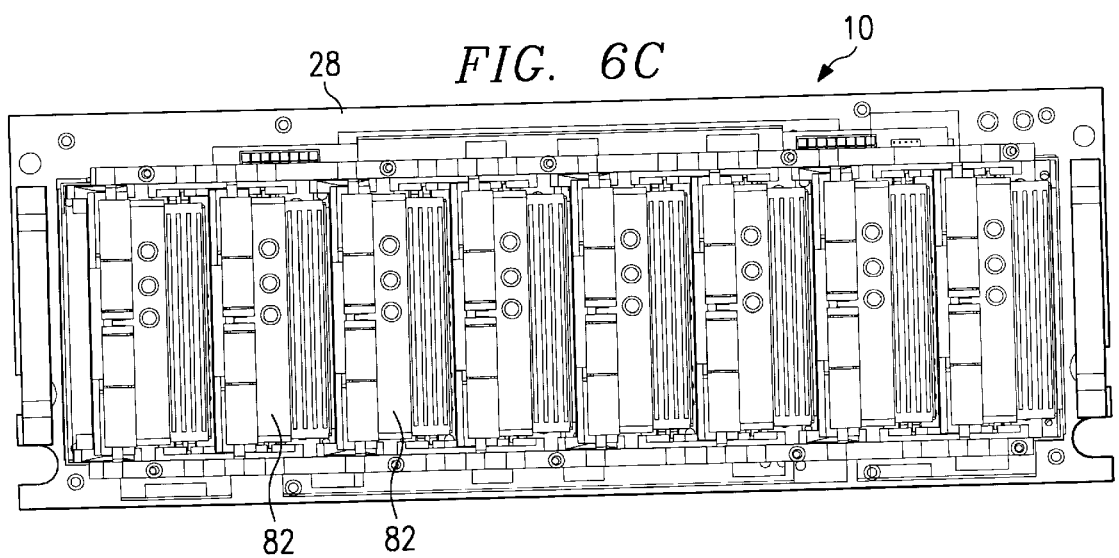

Referring now to FIGS. 5c and 6c, eight separate half height disk drives 82 are assembled within the mounting region 70 of front panel 28 in computer chassis 10. The eight half height disk drives 82 are mounted within the mounting slides 50 and are each coupled to an electrical connector 74. Electrical connectors 74 are disposed on and coupled to front panel 31a of center pluggable interface 12 and interface with I/O cards 67 and 68 through rear panel 31b of center pluggable interface 12. This configuration affords the user a functional disk drive array with an array of half height drives mounted therein.

In accordance with the principles of the present invention, mounting slides 50 and disk drive connectors 74 are provided in the necessary configuration to facilitate either the half height or one-third height disk drives and their compatibility with the center pluggable interface 12.

Although a preferred embodiment of the present invention has been illustrated in the accompanying drawings and described in the foregoing detailed description, it is to be understood that the invention is not limited to the embodiments disclosed, but is capable of numerous rearrangements, modifications and substitutions without departing from the spirit of the invention as set forth and defined by the following claims.

It is claimed:

1. A computer chassis, comprising:
    a housing having a front region and a rear region, said front region of said housing being open and adapted for receiving therein a first electrical component, said rear region of said housing being open and adapted for receiving therein a second electrical component;

an interface secured to said housing and positioned intermediate to said front region and said rear region of said housing;

said interface including a first printed circuit board electrically coupled to a second printed circuit board, said first printed circuit board positioned adjacent said front region of said housing, said second printed circuit board positioned adjacent said rear region of said housing and generally parallel said first printed circuit board;

said interface further including at least two connectors, with a first of said at least two connectors being mounted to said first printed circuit board and a second of said at least two connectors being mounted to said second printed circuit board;

said first connector for connection to the first electrical component when the first electrical component is received in said front region of said housing;

said second connector for connection to the second electrical component when the second electrical component is received in said rear region of said housing; and said interface for electrically coupling said at least two connectors.

2. The computer chassis as recited in claim 1, further comprising:

an isolation structure having at least one wall positioned substantially within said rear region of said housing and adjacent to at least a portion of said interface;

said at least one wall defining at least a first chamber and a second chamber in said rear portion of said chassis; and said isolation structure for isolating said first chamber from said second chamber.

3. The computer chassis as recited in claim 1, further comprising an array of guide channels disposed within said front region of said housing, said guide channels for facilitating the receipt of the first electrical component within said front region.

4. The computer chassis as recited 3, wherein said array of guide channels are configured to receive a select number of a plurality of electronic components of a first size and a select number of a plurality of electronic components of a second size.

5. The computer chassis as recited in claim 1, further comprising:

an isolation structure having a plurality of walls, each of said plurality of walls being positioned substantially within said rear region of said housing and adjacent to at least a portion of said interface;

said plurality of walls defining a plurality of chambers in said rear portion of said chassis; and said isolation structure for isolating each of said plurality of chambers.

6. A computer system comprising:

a housing for supporting a plurality of computer components, said housing having a front region and a rear region, said front region of said housing being open and adapted for receiving therein a first computer component of said plurality of computer components, said rear region of said housing being open and adapted for receiving therein a second computer component of said plurality of computer components;

an interface secured to said housing and positioned intermediate to said front region and said rear region of said housing;

said interface including a first printed circuit board electrically coupled to a second printed circuit board, said first printed circuit board positioned adjacent said front region of said housing, said second printed circuit board positioned adjacent said rear region of said housing and generally parallel said first printed circuit board;

said interface further including at least two connectors, with a first of said at least two connectors being mounted to said first printed circuit board and a second of said at least two connectors being mounted to said second printed circuit board;

said first connector for connection to said first computer component when said first computer component is received in said front region of said housing;

said second connector for connection to said second computer component when said second computer component is received in said rear region of said housing; and said interface for electrically coupling said at least two connectors.

7. The computer system as recited in claims 6, further comprising:

an isolation structure having at least one wall positioned substantially within said rear region of said housing and adjacent to at least a portion of said interface;

said at least one wall defining at least a first chamber and a second chamber in said rear portion of said chassis; and said isolation structure for isolating said first chamber from said second chamber.

8. The computer system as recited in claim 6, further comprising an array of guide channels disposed within said front region of said housing, said guide channels for facilitating the receipt of said first computer component within said front region.

9. The computer system as recited 8, wherein said array of guide channels are configured to receive a select number of a plurality of computer components of a first size and a select number of a plurality of computer components of a second size.

10. The computer system as recited in claim 6, further comprising:

an isolation structure having a plurality of walls, each of said plurality of walls being positioned substantially within said rear region of said housing and adjacent to at least a portion of said interface;

said plurality of walls defining a plurality of chambers in said rear portion of said chassis; and said isolation structure for isolating each of said plurality of chambers.

11. A computer system comprising:

a housing for supporting a plurality of computer components, said housing having a front region and a rear region, said front region of said housing being open and adapted for receiving therein a first computer component of said plurality of computer components, said rear region of said housing being open and adapted for receiving therein a second computer component of said plurality of computer components;

an interface secured to said housing and positioned intermediate to said front region and said rear region of said housing;

said interface including a first printed circuit board electrically coupled to a second printed circuit board, said first printed circuit board positioned adjacent said front region of said housing, said second printed circuit board positioned adjacent said rear region of said housing and generally parallel said first printed circuit board;

said interface further including at least two connectors, with a first of said at least two connectors being mounted to said first printed circuit board and a second of said at least two connectors being mounted to said second printed circuit board;

said first connector for connection to said first computer component when said first computer component is received in said front region of said housing;

said second connector for connection to said second computer component when said second computer component is received in said rear region of said housing;

said interface for electrically coupling said first computer component with said second component; and wherein said at least one of said at least two connectors is hot pluggable.

12. The computer system as recited in claim 11, further comprising:

an isolation structure having a plurality of walls, each of said plurality of walls being positioned substantially within said rear region of said housing and adjacent to at least a portion of said interface;

said plurality of walls defining a plurality of chambers in said rear portion of said chassis, each of said plurality of chambers for receiving one of said plurality of computer components; and said isolation structure for isolating each of said plurality of components in each of said plurality of chambers.

13. The computer system as recited in claim 12, further comprising an array of guide channels disposed within said front region of said housing, said guide channels for facilitating the receipt of said first computer component within said front region.

14. The computer system as recited 13, wherein said array of guide channels are configured to receive a select number of a plurality of computer components of a first size and a select number of a plurality of computer components of a second size.

15. The computer system as recited in claim 14, further comprising an array of guide channels disposed within at least one of said chambers in said rear region of said housing, said guide channels for facilitating the receipt of said second computer component within said rear region.

* * * * *